United States Patent Office 3,737,450
Patented June 5, 1973

3,737,450
INSECT CONTROL AGENTS
Clive A. Henrick and John B. Siddall, Palo Alto, Calif.,
assignors to Zoecon Corporation, Palo Alto, Calif.
No Drawing. Filed Nov. 22, 1971, Ser. No. 201,165
Int. Cl. C07c 69/74, 61/16, 57/02
U.S. Cl. 260—468 H                                      8 Claims

ABSTRACT OF THE DISCLOSURE

Aliphatic hydrocarbon cyclopropyl and bis-cyclopropyl and aliphatic substituted cyclopropyl and bis-cyclopropyl acids and esters and derivatives thereof, intermediates therefor, syntheses thereof, and the control of insects.

---

This invention relates to novel aliphatic cyclopropyl and bis-cyclopropyl compounds, intermediates therefor, syntheses thereof, and the control of insects. More particularly, the novel aliphatic cyclopropyl and bis-cyclopropyl compounds of the present invention are represented by the following formulas:

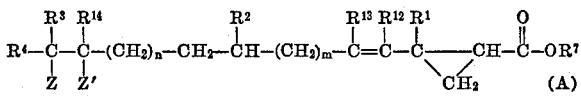
(A)

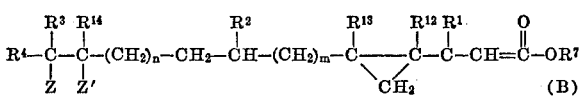
(B)

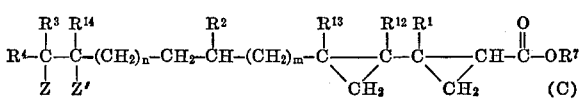
(C)

wherein,

Z is hydrogen, lower alkyl, chloro, bromo, fluoro-OH or SR' in which R is hydrogen, carboxylic acyl, lower alkyl, cycloalkyl, aralkyl, or aryl, and R' is lower alkyl, cycloalkyl, aralkyl, or aryl;

Z' is hydrogen or taken together with Z forms a carbon-carbon double bond;

each of $m$ and $n$ is 0 or the positive integer 1, 2, or 3;
each of $R^1$ and $R^2$ is lower alkyl;
$R^4$ is alkyl;
each of $R^3$, $R^{12}$, $R^{13}$ and $R^{14}$ is hydrogen or lower alkyl; and
$R^7$ is hydrogen, lower alkyl, cycloalkyl, aryl, aralkyl, lower alkylthiaalkyl, lower alkoxyalkyl, halogen substituted lower alkyl, heterocyclo or a metal cation.

The compounds of Formula A, B and C are useful for the control of insects. The utility of these compounds as insect control agents is believed to be attributable to their juvenile hormone activity. They are preferably applied to the immature insect, namely during the embryo, larvae or pupae stages in view of their effect on metamorphosis and their ability by other means to cause abnormal development leading to death or the inability to reproduce. These compounds are effective control agents for Hemipteran, such as Lygaeidae, Miridae, and Pyrrhocoridae; Lepidopteran such as Pyralidae, Noctuidae and Gelechiidae; Coleopteran, such as Tenebrionidae, Crysomelidae, and Dermestidae; Dipteran, such as mosquitoes and flies; Homopteran, such as aphids; and other insects. The compounds can be applied at low dosage levels of the order of 0.01 microgram to 25.0 micrograms per insect. Suitable carrier substances include liquid or solid inert carriers, such as water, acetone, xylene, mineral or vegetable oils, talc, vermiculite, natural and synthetic resins and silicon. Treatment of insects in accordance with the present invention is accomplished by spraying, dusting or exposing the insects to the vapor of compounds of Formulae A, B, or C. Generally, a concentration of less than 25% of the active compound is employed. The formulation can include insect attracts, emulsifying agents or wetting agents to assist in the application and effectiveness of the active ingredient.

In the description hereinafter, each of R', R–R⁴, R⁷, $R^{12}$–$R^{14}$, Z, Z', $m$ and $n$ is as defined above, unless otherwise specified.

Embraced within the compounds of Formulas A, B and C are the terminally unsaturated (i.e., Z' taken together with Z forms a carbon-carbon double bond) compounds of the present invention represented by Formulas D, E, and F:

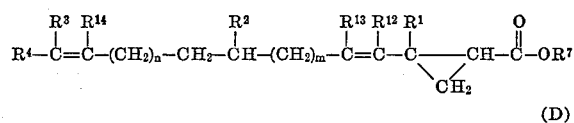
(D)

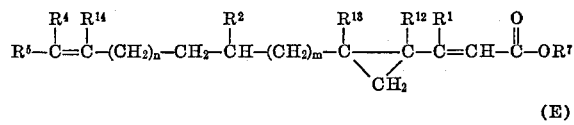
(E)

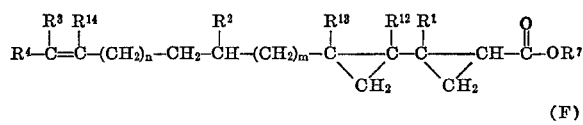
(F)

The compounds of Formulas D, E and F, in addition to their utility for the control of insects, serve as precursors for the preparation of compounds of Formulas A, B and C.

The novel compounds of the present invention are prepared from an ester of Formula I:

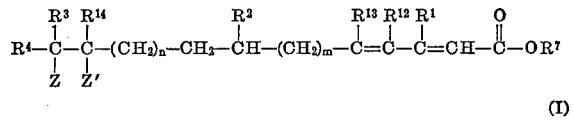
(I)

by reaction with dimethyl sulfoxomium methylide either in dimethyl sulfoxide or dimethylformamide as solvents. The preparation of dimethylsulphoxide methylide by the reaction of sodium hydride with trimethyloxosulfonium iodide is described by Corey et al., Organic Synthesis, 49,778-80. The reaction in dimethylsulfoxide is described by Corey et al., J. Amer. Chem. Soc., 84, 867 and 3782 (1962); Corey et al., J. Amer. Chem. Soc., 87, 1353 (1965) and Kaiser et al., J. Org. Chem. 30, 3972 (1965). Landor et al., J. Chem. Soc. (C), 1967, 2495–2500, have found that dimethylformamide may also be used as a solvent. All of these reactions generally give a mixture of 2,3 and 4,5 monocyclopropyl and 2,3; 4,5-bis-cyclopropyl compounds which can be separated by fractional distillation or chromatography or used for insect control as a mixture. Landor et al., supra, have shown that under forcing conditions, with a four-fold excess of methylide, enhanced yields of bis-cyclopropyl products can be obtained.

The esters of Formula I can be prepared from a carbonyl of Formula II by reaction with a carbanion of a phosphonate of Formula III.

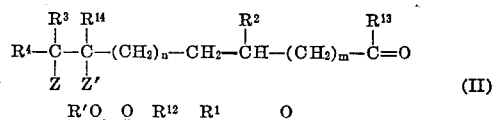
(II)

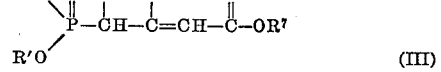
(III)

Preparation of the esters of Formula I is fully described in application Ser. No. 187,898, filed Oct. 8, 1971; application Ser. No. 187,897; filed Oct. 8, 1971; and application Ser. No. 201,189, filed on Nov. 22, 1971, the entire disclosures of which are hereby incorporated by reference.

Examples of compounds included within Formula I useful for the preparation of compounds of the present invention are the following:

s-butyl 3,7,11-trimethyldodeca-2,4-dienoate,
n-propyl 3,7,11-trimethyldodeca-2,4-dienoate,
i-butyl 3,7,11-trimethyldodeca-2,4-dienoate,
n-propyl-3,7,11-trimethyldodeca-2,4,10-trienoate,
ethyl 11-methylthio-3,7,11-trimethyldodeca-2,4-dienoate,
i-butyl 3,7,11-trimethyltrideca-2,4-dienoate,
ethyl 3,7,11,11-tetramethyldodeca-2,4-dienoate,
isopropyl 3,7,11,11-tetramethyltrideca-2,4-dienoate,
isopropyl 11-ethoxy-3,7,11-trimethyldodeca-2,4-dienoate,
isopropyl 3,7,11-trimethyltrideca-2,4-dienoate,
isopropyl 11-isopropoxy-3,7,11-trimethyldodeca-2,4-dienoate,
isopropyl 11-ethylthio-3,7,11-trimethyldodeca-2,4-dienoate,
isopropyl 11-acetoxy-3,7,11-trimethyldodeca-2,4-dienoate,
ethyl 11-methylthio-3,7,11-trimethyldodeca-2,4-dienoate,
isopropyl 3,7,10-trimethylundeca-2,4-dienoate,
isopropyl 10-methoxy-3,7,10-trimethylundeca-2,4-dienoate,
ethyl 3,7,9,10-tetramethylundeca-2,4-dienoate,
isopropyl 10-methylthio-3,7,10-trimethylundeca-2,4-dienoate
phenyl 3,7,11-trimethyldodeca-2,4,10-trienoate.
cyclohexyl 3,7,11-trimethyldodeca-2,4-dienoate,
benzyl 3,7,11-trimethyldodeca-2,4-dienoate,
phenyl 3,7,11-trimethyldodeca-2,4-dienoate,
n-pentyl 3,7,11-trimethyldodeca-2,4-dienoate,
n-hexyl 3,7,11-trimethyldodeca-2,4-dienoate,
i-propyl 3,7,11-trimethyldodeca-2,4-dienoate,
methyl 3,7,11-trimethyltrideca-2,4-dienoate,
t-butyl 3,7,11-trimethyltrideca-2,4-dienoate,
n-propyl 3,7,11-trimethyltrideca-2,4-dienoate,
s-butyl 3,7,11-trimethyltrideca-2,4-dienoate,
isobutyl 3,7,11-trimethyltrideca-2,4-dienoate,
neopentyl 3,7,11-trimethyltrideca-2,4-dienoate,
2'-methylpent-1'-yl 3,7,11-trimethyltrideca-2,4-dienoate,
hex-2'-yl 3,7,11-trimethyltrideca-2,4-dienoate,
3'-methylpent-1'-yl 3,7,11-trimethyltrideca-2,4-dienoate,
cyclopentyl 3,7,11-trimethyltrideca-2,4-dienoate,
p-ethylphenyl 3,7,11-trimethyltrideca-2,4-dienoate,
beta-phenylethyl 3,7,11-trimethyltrideca-2,4-dienoate,
p-methylbenzyl 3,7,11-trimethyltrideca-2,4-dienoate,
2'-fluoroethyl 3,7,11-trimethyltrideca-2,4-dienoate,
2',2'-dichloroethyl 3,7,11-trimethyltrideca-2,4-dienoate,
2',2',2'-trichloroethyl 3,7,11-trimethyltrideca-2,4-dienoate,
2'-chloroprop-1'-yl 3,7,11-trimethyltrideca-2,4-dienoate,
cyclohexyl 11-methoxy-3,7,11-trimethyldodeca-2,4-dienoate,
n-propyl 11-methoxy-3,7,11-trimethyldodeca-2,4-dienoate,
i-butyl 11-methoxy-3,7,11-trimethyldodeca-2,4-dienoate,
benzyl 11-methoxy-3,7,11-trimethyldodeca-2,4-dienoate,
phenyl 11-methoxy-3,7,11-trimethyldodeca-2,4-dienoate,
n-hexyl 11-methoxy-3,7,11-trimethyldodeca-2,4-dienoate,
3',3'-dimethylpentyl 11-methoxy-3,7,11-trimethyldodeca-2,4-dienoate,
2'-chloropropyl-3,7,11-trimethyldodeca-2,4,10-trienoate,
3'-thiacyclohexyl-3,7,11-trimethyldodeca-2,4,10-trienoate,
2'-methylpentyl 11-methoxy-3,7,11-trimethyldodeca-2,4-dienoate,
hexan-2'-yl 11-methoxy-3,7,11-trimethyldodeca-2,4-dienoate,
3'-methylpentyl 11-methoxy-3,7,11-trimethyldodeca-2,4-dienoate,
p-ethylphenyl 11-methoxy-3,7,11-trimethyldodeca-2,4-dienoate,
beta-phenylethyl 11-methoxy-3,7,11-trimethyldodeca-2,4-dienoate,
2'-fluoroethyl 11-methoxy-3,7,11-trimethyldodeca-2,4-dienoate,
2',2'-dichloroethyl 11-methoxy-3,7,11-trimethyldodeca-2,4-dienoate,
2'-chloropropyl 11-methoxy-3,7,11-trimethyldodeca-2,4-dienoate,
2',2',2'-trichloroethyl 11-methoxy-3,7,11-trimethyldodeca-2,4-dienoate,
p-methylthiophenyl 11-methoxy-3,7,11-trimethyldodeca-2,4-dienoate,
3'-thiacyclohexyl 11-methoxy-3,7,11-trimethyldodeca-2,4-dienoate,
2',2',2'-trifluoroethyl 11-methoxy-3,7,11-trimethyldodeca-2,4-dienoate,
t-butyl 11-methoxy-3,7,11-trimethyldodeca-2,4-dienoate,
2'-methoxyethyl 11-methoxy-3,7,11-trimethyldodeca-2,4-dienoate,
2'-methylthioethyl 11-methoxy-3,7,11-trimethyldodeca-2,4-dienoate,
s-butyl 11-methoxy-3,7,11-trimethyldodeca-2,4-dienoate,
methyl 11-methylthio-3,7,11-trimethyldodeca-2,4-dienoate,
isopropyl 11-methylthio-3,7,11-trimethyldodeca-2,4-dienoate,
methyl 10-methylthio-3,7,9,10-tetramethylundeca-2,4-dienoate,
methyl 9-methylthio-3,6,9-trimethyldeca-2,4-dienoate,
methyl 9-methylthio-3,6,8,9-tetramethyldeca-2,4-dienoate,
methyl 11-methylthio-3,7,11-trimethyltrideca-2,4-dienoate,
methyl 11-methylthio-3,7-dimethyl-11-ethyltrideca-2,4-dienoate,
methyl 11-methylthio-3,11-dimethyl-7-ethyltrideca-2,4-dienoate,
methyl 11-methylthio-3,7,10,11-tetramethyldodeca-2,4-dienoate,
methyl 10-methylthio-3,7,10-trimethylundeca-2,4-dienoate,
methyl 11-ethylthio-3,7,11-trimethyldodeca-2,4-dienoate.

The term "cycloalkyl," as used herein, refers to a cyclic alkyl group of four to eight carbon atoms. The term "aralkyl" refers to a monovalent hydrocarbon group in which an aryl group is substituted for a hydrogen atom of an alkyl group, such as benzyl, xylyl, mesityl, phenylethyl, methylbenzyl, naphthylmethyl and naphthylethyl containing up to twelve carbon atoms. The term "aryl," as used herein, refers to an aromatic group of up to twelve carbon atoms. Typical aromatic groups include phenyl, naphthyl, lower alkylphenyl such as methylphenyl, ethylphenyl and t-butylphenyl isopropylphenyl, lower alkylthiophenyl such as methylthiophenyl, ethylthiophenyl and isopropylthiophenyl, lower alkoxyphenyl such as methoxyphenyl and ethoxyphenyl, halophenyl such as chlorophenyl, bromophenyl, iodophenyl and fluoropenyl, nitrophenyl, methylenedioxyphenyl, lower alkenylphenyl such as vinylphenyl and allylphenyl. In the case of substituted phenyl, the substituent such as lower alkyl, lower alkylthio, lower alkoxy, halo, nitro, lower alkenyl carbonyl, lower alkoxycarbonyl, cyano, and amido can be in one or more positions of the phenyl ring, usually in the para position. The term "heterocyclic," as used herein, refers to a heterocyclic group consisting of four or five carbon atoms and one heteroatom which is oxygen, nitrogen or sulfur such as the heterocylics pyridine, pyran, thiophan, pyrole, furan and thiophen.

The term "hydroxyalkyl," as used herein, refers to an alkyl group substituted with one hydroxy group, e.g. hydroxy-methyl, p-hydroxyethyl and 4-hydroxypentyl. The term "alkoxyalkyl," as used herein, refers to an alkyl group substituted with one alkoxy group, e.g.

methoxymethyl, 2-methoxyethyl, 4-ethoxybutyl, n-propoxyethyl and t-butoxyethyl. The term "alkenyl," as used herein, refers to an ethylenically unsaturated hydrocarbon group, branched or straight chain, having a chain length of two to twelve carbon atoms, e.g. allyl, vinyl, 3-butenyl, 2-hexenyl and i-propenyl. Whenever any of the foregoing terms are modified by the word "lower," the chain length of the group is not more than six carbon atoms with the exception of lower alkoxyalkyl and lower alkylthiaalkyl in which even a total chain length of twelve carbon atoms is the maximum. The term "halogen substituted lower alkyl," as used herein refers to a lower alkyl group substituted with one to three halogen atoms such as chloromethyl, fluoromethyl, 2,2,2-trifluoroethyl, 2,2,2-trichloroethyl and the like.

The term "carboxylic acyl," as used herein, refers to the acyl group of a carboxylic acid, anhydride or halide. The acyl group is determined by the particular carboxylic acid halide or carboxylic acid anhydride employed in the esterification. Although no upper limitation need be placed on the number of carbon atoms contained in the acyl group within the scope of the present invention, generally it contains from one to eighteen carbon atoms. Typical esters of the present invention include formate, acetate, propionate, enathate, benzoate, trimethylacetate, trichloroacetate, trifluoroacetate, t-butylaceate, phenoxyacetate, cyclopentylpropionate, aminoacetate, β-chloropropionate, adamantoate, octadec-9-enoate, dichloroacetate, butyrate, pentanoate, hexanoate, phenylacetate, p-methylbenzoate, β - phenylpropionate, 3,4 - dimethylbenzoate, p-isopropylbenzoate, cyclohexylacetate, stearate, methacrylate, p-chloromethylbenzoate, p-methoxybenzoate and p-nitrobenzoate.

The term "metal," as used herein, refers to lithium, sodium, potassium, calcium, strontium, copper, manganese and zinc. The term "alkyl" refers to a saturated aliphatic hydrocarbon of one to twelve carbon atoms. The term "lower alkyl" refers to an alkyl group having a chain length of one to six carbon atoms.

The following examples are provided to illustrate the practice of the present invention. Temperature is given in degrees centigrade.

EXAMPLE 1

To a suspension of 1.2 g. of sodium hydride in 100 ml. of dimethylsulfoxide is added 11.05 g. of trimethylsulfoxonium iodide, under nitrogen. The mixture is stirred for about 45 minutes until evolution of hydrogen ceases and reaction is at about room temperature. Then (11.8 g.) methyl 3.7.11-trimethyldodeca-2,4-dienoate in 25 ml. of dimethyl sulfoxide is added. The reaction is stirred for about two hours and then poured into ice water containing a small amount of hydrochloric acid. The mixture is extracted with ether. The combined ethereal extracts are washed with water, dried over magnesium sulfate, and evaporated under reduced pressure to give a reaction product mixture containing crude methyl 2,3-cyclopropyl-3,7,11-trimethyldodec-4-enoate which can be separated and purified by fractional distillation. From the product mixture is separated methyl 4,5-cyclopropyl-3,7,11-trimethyldodec -2-enoate and methyl 2,3; 4,5-biscyclopropyl-3,7,11-trimethyldodecanoate by fractional distillation. The products can be further purified by G.L.C.

The process of the example is repeated using 10.66 grams of i-propyl 11-methoxy-3,7,11-trimethyldodeca-2,4-dienoate to prepare i-propyl 2,3-cyclopropyl-11-methoxy-3,7,11 - trimethyldodeca - 4 - enoate, i - propyl 4,5-cyclopropyl - 11 - methoxy - 3,7,11 - trimethyldodeca - 2-enoate and i-propyl 2,3; 4,5 bis-cyclopropyl-11-methoxy-3,7,11-trimethyldodecanoate, predominantly i-propyl 2,3-cyclopropyl-11-methoxy-3,7,11-trimethyldodeca-4-enoate.

EXAMPLE 2

To a suspension of 1.2 g. of sodium hydride in 100 ml. of dimethylformamide is added 11.05 g. of trimethyl- sulfoxonium iodide, under nitrogen. The mixture is stirred and after hydrogen ceases to evolve, stirring is continued for 15 minutes and then 12.5 g. of ethyl 3,7,11-trimethyldodeca-2,4-dienoate in 25 ml. of dimethylformamide is added. Stirring is continued for about one hour and then poured into ice water containing a small amount of hydrochloric acid (2–3%). The mixture is extracted with ether. The combined ether extracts are washed with water and the aqueous extracts backwashed with ether. The combined ether portions are dried over magnesium sulfate and evaporated under reduced pressure to yield crude ethyl 2,3-cyclopropyl-3,7,11 - trimethyldodec - 4 - enoate which is separated by fractional distillation. Further fractional distillation provides ethyl 4,5-cyclopropyl-3,7,11-trimethyldodec -2-enoate and ethyl 2,3; 4,5-biscyclopropyl-3,7,11-trimethyldodecanoate. The products can be further purified by G.L.C.

The process of the example is repeated using 12.07 g. of methyl 11 - methylthio - 3,7,11 - trimethyldodeca - 2,4-dienoate to prepare methyl 2,3-cyclopropyl-11-methylthio-3,7,11-trimethyldodec -4-enoate, methyl 4,5 - cyclopropyl-11-methylthio-3,7,11-trimethyldodec -2-enoate and methyl 2,3; 4,5 bis cyclopropyl-11-methylthio-3,7,11-trimethyldodecanoate, predominately methyl 2,3-cyclopropyl-11-methylthio-3,7,11-trimethyldodec -4-enoate.

EXAMPLE 3

To a suspension of 2.4 g. of sodium hydride in 150 ml. of dimethylsulfoxide is added 22.1 g. of trimethylsulfoxonium iodide, under nitrogen. The mixture is stirred until evolution of hydrogen ceases and then stirred an additional 15 minutes. The solution is cooled to 0° and then 5.9 g. of methyl 3,7,11-trimethyldodeca-2,4-dienoate in 30 ml. of dimethylsulfoxide is added. The reaction is stirred for 3 hours at room temperature, one hour at 60° and one hour at room temperature. The reaction is worked up as described above to give methyl 2,3-cyclopropyl-3,7,11-trimethyldodec-4-enoate and the 2,3;4,5-biscyclopropane.

The process of the example is repeated using 10.8 g. of methyl 3,7,11-trimethyldodeca-2,4-dienoate to prepare methyl 2,3-cyclopropyl-3,7,11-trimethyldodec -4 - enoate, methyl 4,5-cyclopropyl-3,7,11-trimethyldodec - 2 - enoate and methyl 2,3; 4,5-bis cyclopropyl - 3,7,11 - trimethyldodecanoate, predominantly methyl 2,3-cyclopropyl-3,7, 11-trimethyldodec-4-enoate.

The process of the example is repeated using methyl 11-hydroxy-3,7,11 - trimethyldodeca - 2,4 - dienoate and methyl 11-chloro-3,7,11-trimethyldodeca - 2,4 - dienoate to prepare mixtures composed predominantly of methyl 2,3 - cyclopropyl - 11 - hydroxy - 3,7,11 - trimethyldodec -4-enoate and methyl 2,3 - cyclopropyl - 11 - chloro - 3, 7,11-trimethyldodec -4-enoate, respectively.

The process of the example is repeated using 2'-pyridyl 3,7,11-trimethyldodeca-2,4-dienoate and 2' - thienyl 3,7, 11-trimethyldodeca - 2,4 - dienoate to prepare mixtures composed predominantly of 2'-pyridyl 2,3-cyclopropyl-3, 7,11-trimethyldodec -4-enoate and 2'-thienyl 2,3-cyclopropyl-3,7,11-trimethyldodec-4-enoate, respectively.

EXAMPLE 4

To a stirred suspension of 0.11 mole of trimethylsulfoxonium iodide in 100 ml. of dimethylsulfoxide, at 25–30°, under nitrogen, is added 0.11 mole of sodium hydride in mineral oil. When hydrogen evolution ceases, a solution of 26.4 g. of isopropyl trans,trans 3,7,11-trimethyldodeca-2,4-dienoate in 50 ml. of dimethylsulfoxide is added slowly maintaining temperature below 35°. After addition is complete, the reaction is stirred for 30 minutes at about 30° and for one hour at about 60°. The reaction is then poured into water and extracted with ether. The ether extracts are combined, washed, dried and evaporated under reduced pressure. The crude product is fractionally distilled to separate isopropyl trans,trans 2,3 - cyclopropyl - 3,7,11 - trimethyldodec - 4-enoate which can be further purified by chromatography.

By using isopropyl 3,7,11-trimethyldodeca-2,4,10-trienoate in the above process, the respective 2,3-cyclopropane; 4,5-cyclopropane and 2,3; 4,5-bis cyclopropane are prepared.

EXAMPLE 5

To a solution of 2 g. of isopropyl trans, trans 3,7,11-trimethyldodeca-2,4,10-trienoate and 30 ml. of isopropanol, cooled to 0° and under nitrogen, is added 4.9 g. of acetyl chloride dropwise. After addition is complete, the ice-bath is removed and the reaction stirred at room temperature for about 60 hours. Then isopropanol is removed by evaporation and the residue poured into hexane-water. The hexane layer is washed with aqueous sodium bicarbonate, water and brine, dried over calcium sulfate and solvent evaporated to give isopropyl trans, trans 11-chloro-3,7,11 - trimethyldodeca - 2,4 - dienoate which can be further purifified by column chromatography.

Following the procedure of this example, there is prepared isopropyl 11-chloro-2,3-cyclopropyl-3,7,11-trimethyl dodec-4-enoate, ethyl 11-chloro-2,3-cyclopropyl-3,7,11-trimethyldodec-4-enoate, isopropyl 11-chloro-4,5-cyclopropyl-3,7,11-trimethyldodec-2-enoate, and isopropyl 11-chloro-2,3,4,5-bicyclopropyl-3,7,11-trimethyldodecanoate from each of isopropyl 2,3-cyclopropyl-3,7,11-trimethyldodec-4,10-dienoate, ethyl 2,3-cyclopropyl-3,7,11-trimethyldodeca-4,10-dienoate, isopropyl 4,5-cyclopropyl-3,7,11-trimethyldodeca-2,10-dienoate, and isopropyl 2,3,4,5-biscyclopropyl-3,7,11-trimethyldodec-10-enoate, respectively.

EXAMPLE 6

A mixture of one g. of methyl 2,3-cyclopropyl-3,7,11-trimethyldodec-4-enoate, 60 ml. of methanol, 0.5 g. of potassium hydroxide and 6 ml. of water is stirred one hour at room temperature and then refluxed for eight hours. After cooling, the mixture is diluted with water, neutralized and extracted with ether. The ethereal extracts are washed with water, dried and evaporated to give 2,3-cyclopropyl-3,7,11-trimethyldodec-4-enoic acid.

Using the procedure of this example, other free acids of the present invention are prepared by hydrolysis of the respective ester.

EXAMPLE 7

To 0.60 g. of 2,3-cyclopropyl-3,7,11-trimethyldodec-4-enoic acid and 10 ml. of dry benzene, under nitrogen, is added 0.30 ml. of oxalyl chloride. The mixture is stirred mildly at room temperature for about 2 hours. Then 2 ml. of isopropanol is added with stirring. After about 4 hours, the reaction is worked up by extraction with ether, washing with sodium bicarbonate and brine, drying over calcium sulfate and isolation by evaporation under reduced pressure to yield isopropyl 2,3-cyclopropyl-3,7,11-trimethyldodec-4-enoate.

By using other monohydric alcohols in the process of this example in place of isopropanol, the respective esters are prepared.

EXAMPLE 8

To a mixture of 2.0 g. of mercuric acetate, 6 ml. of water and 20 ml. of tetrahydrofuran is added 1.62 g. of isopropyl 2,3-cyclopropyl-3,7,11-trimethyldodeca - 4,10-dienoate slowly. After addition is complete, the reaction mixture is stirred for about 20 minutes. The mixture is cooled to about 0° and 6 ml. of aqueous NaOH (3 molar) is added followed by 0.5 g. of sodium borohydride in aqueous NaOH (3 molar). The mixture is stirred for about 30 minutes. The mixture is then decanted, concentrated and the concentrate diluted with water which is extracted with ether. The ethereal extracts are washed with water, dried over magnesium sulfate and evaporated to yield isopropyl 11-hydroxy-2,3-cyclopropyl-3,7,11-trimethyldodec-4-enoate.

Other terminally unsaturated esters of Formulas D, E, and F used as the starting material in the process of this example provide compounds of Formulas A, B and C, respectively, wherein Z is hydroxy and Z' is hydrogen.

EXAMPLE 9

A mixture of 3.0 g. of sodium acetate and 20 ml. of acetic anhydride is stirred at room temperature for 0.5 hour. To the mixture is added 2.8 g. of isopropyl 11-hydroxy-2,3-cyclopropyl-3,7,11 - trimethyldodec-4-enoate. The reaction mixture is warmed up to about 100° for about 16 hours. After cooling, the mixture is poured into sat. sodium bicarbonate and then extracted with ether. The ethereal extracts are washed with aqueous sodium bicarbonate, water and sat. brine, dried over calcium sulfate and evaporated under reduced pressure to give crude isopropyl 11 - acetoxy-2,3-cyclopropyl-3,7,11-trimethyldodec-4-enoate which can be purified by distillation.

EXAMPLE 10

Isopropyl 3,7,11,11-tetramethyltrideca-2,4-dienoate is used as the starting material in the process of Example 2 to prepare isopropyl 2,3-cyclopropyl 3,7,11,11-tetramethyltridec-4-enoate, isopropyl 4,5-cyclopropyl 3,7,11,11-tetramethyltridec-2-enoate, and isopropyl 2,3,4,5-biscyclopropyl-3,7,11,11-tetramethyltridecanoate.

What is claimed is:

1. A compound selected from those of the formula:

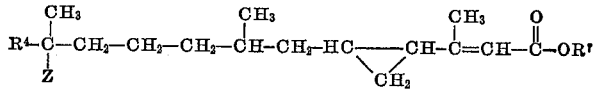

wherein, $R^4$ is methyl or ethyl;
$R^7$ is lower alkyl; and
Z is hydrogen, methyl, ethyl or lower alkoxy.

2. A compound according to claim 1 wherein Z is methoxy.

3. The compound according to claim 1 wherein Z is methoxy; $R^4$ is methyl; and $R^7$ is isopropyl.

4. A compound according to claim 1 wherein Z is hydrogen.

5. A compound according to claim 1 wherein Z is hydrogen; $R^4$ is methyl and $R^7$ is methyl or ethyl.

6. A compound according to claim 1 wherein Z is chloro.

7. The compound according to claim 1 wherein Z is chloro; $R^4$ is methyl; and $R^7$ is isopropyl.

8. The compound according to claim 1 wherein Z is methyl; $R^4$ is ethyl; and $R^7$ is isopropyl.

References Cited

Slama et al., Biol. Bull., 139, 222 (1970).
Slama, Ann. Rev. of Biochem. 40, 1088, (1971).
Krimer et al., J. Org. Chem. U.S.S.R. 7, 1412 (1971).

LORRAINE A. WEINBERGER, Primary Examiner

R. GERSTL, Assistant Examiner

U.S. Cl. X.R.

260—295 R, 327 TH, 399, 332 R, 405, 410, 410.5, 410.9 N, 413, 429 R, 429.9, 438.1, 468 F, 470, 473 G, 476 R, 487, 488 R, 488 H, 514 H, 514 G, 516, 520, 599, 600, 601 R, 602; 424—305, 317